United States Patent
Thomas

(10) Patent No.: US 9,322,426 B2
(45) Date of Patent: Apr. 26, 2016

(54) NUT AND SLEEVE FASTENER

(71) Applicant: R B & W MANUFACTURING LLC, Streetsboro, OH (US)

(72) Inventor: David E. Thomas, Kent, OH (US)

(73) Assignee: RB&W MANUFACTURING LLC, Streetsboro, OH (US)

( * ) Notice: Subject to any disclaimer, the term of this patent is extended or adjusted under 35 U.S.C. 154(b) by 249 days.

(21) Appl. No.: 13/873,899

(22) Filed: Apr. 30, 2013

(65) Prior Publication Data

US 2014/0321946 A1     Oct. 30, 2014

(51) Int. Cl.
*F16B 43/00* (2006.01)
*F16B 39/00* (2006.01)
*F16B 31/02* (2006.01)

(52) U.S. Cl.
CPC ............ *F16B 39/00* (2013.01); *F16B 31/02* (2013.01); *F16B 31/021* (2013.01); *F16B 43/00* (2013.01)

(58) Field of Classification Search
CPC .......... F16B 39/00; F16B 31/02; F16B 43/00; F16B 31/021; F16B 37/0864; F16B 41/002; F16B 39/24; F16B 9/02; Y10S 411/935
USPC .............................. 411/10, 533, 535–537, 544
See application file for complete search history.

(56) References Cited

U.S. PATENT DOCUMENTS

| | | | |
|---|---|---|---|
| 867,351 A * | 10/1907 | Doelp | F16B 39/32 411/272 |
| 1,329,126 A * | 1/1920 | Leming | F16K 27/08 138/89.4 |
| 1,384,019 A * | 7/1921 | Johnston | F16B 39/26 411/270 |
| 1,961,470 A * | 6/1934 | Winchester et al. | 411/134 |
| 2,169,047 A * | 8/1939 | Horn | 301/35.628 |
| 2,520,259 A * | 8/1950 | Pummill | 411/265 |
| 2,690,201 A * | 9/1954 | Fineran | 411/270 |
| 3,030,996 A * | 4/1962 | Doerr | 411/270 |
| 3,087,371 A * | 4/1963 | Orner | F16B 31/028 411/11 |
| 4,431,353 A * | 2/1984 | Capuano | B60B 3/145 411/11 |
| 4,971,498 A * | 11/1990 | Goforthe | 411/134 |
| 5,597,279 A | 1/1997 | Thomas et al. | |

FOREIGN PATENT DOCUMENTS

| | | |
|---|---|---|
| DE | 2613192 A1 | 10/1977 |
| GB | 2127122 A | 4/1984 |
| WO | 98/46892 A1 | 10/1998 |
| WO | 2005/003573 A1 | 1/2005 |

* cited by examiner

*Primary Examiner* — Gary Estremsky
(74) *Attorney, Agent, or Firm* — Pearne & Gordon LLP

(57) ABSTRACT

A fastener includes a nut having an anterior portion, a posterior portion and a threaded bore with a center axis extending from the anterior portion to the posterior portion, the outer surface of the posterior portion having an annular camming surface concentric with the center axis, the camming surface having a radius that decreases along the direction of the center axis away from the anterior portion toward the posterior portion; and a sleeve having a first end having an internal annular camming surface that engages the nut camming surface concentrically with the center axis and a second end having a thrusting surface. Tightening the fastener on an externally threaded member applies a force to the thrusting surface parallel to the center axis resulting in the nut camming surface and the sleeve camming surface cooperating to compress a portion of the threaded bore toward the threaded member.

3 Claims, 4 Drawing Sheets

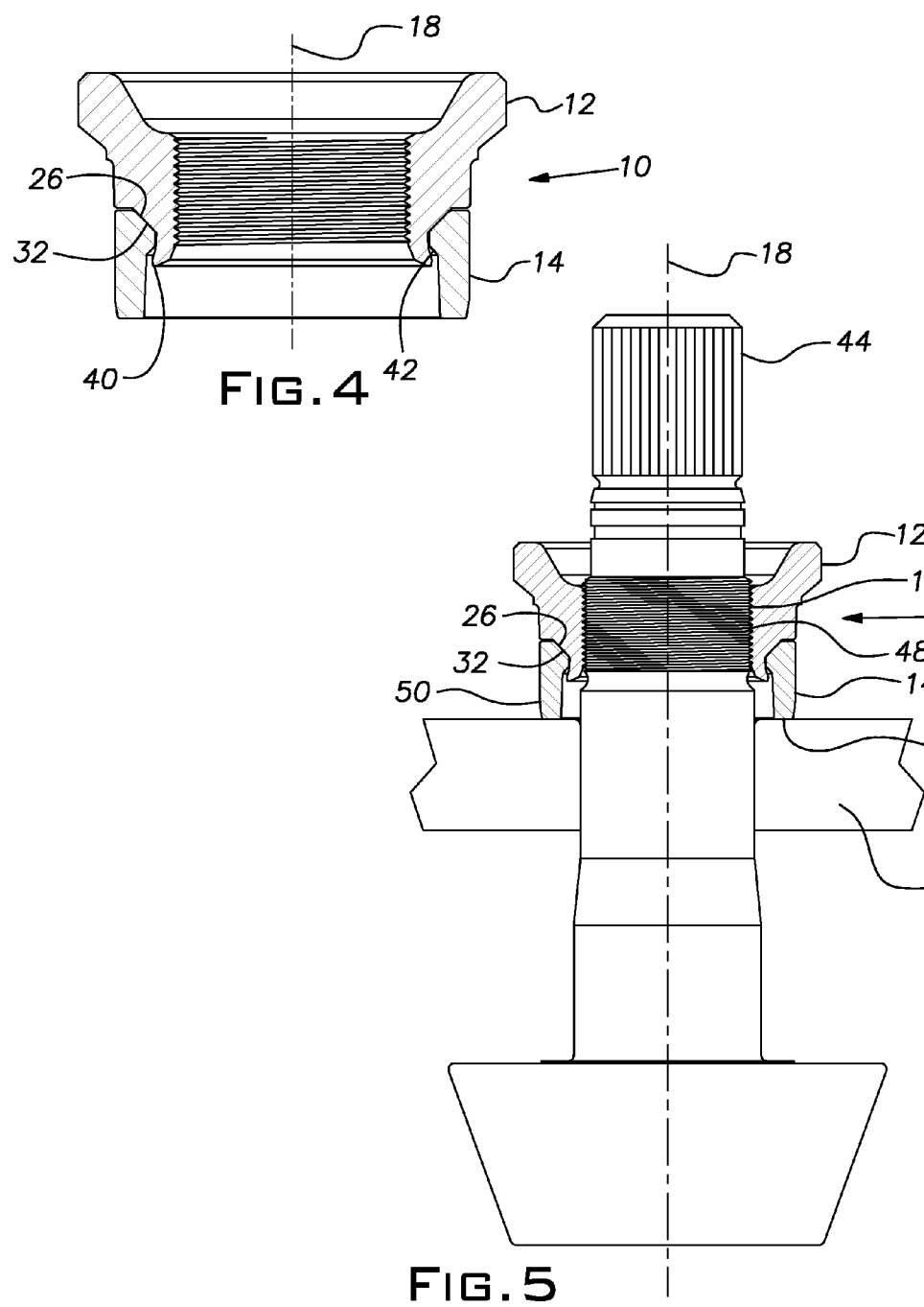

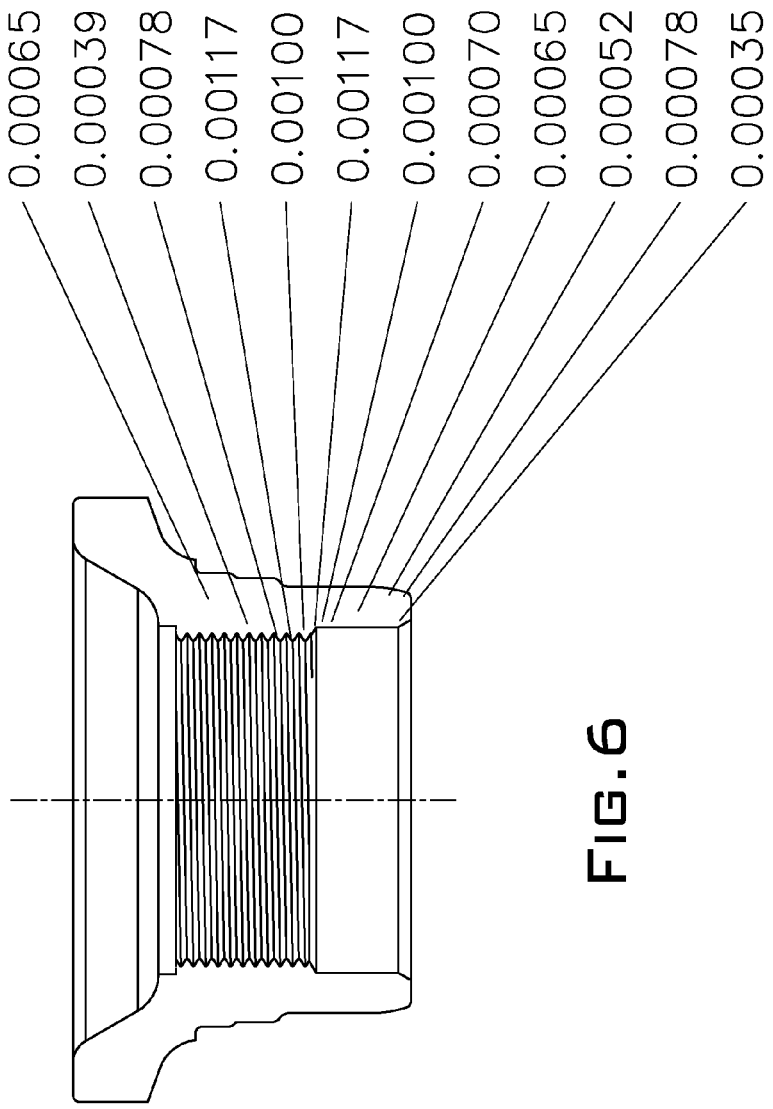

NUT AND SLEEVE FASTENER

BACKGROUND OF THE INVENTION

The present invention relates to fasteners and, in particular, to a nut and sleeve combination.

In many applications it can be difficult to prevent the loosening of threaded fasteners. It can be particularly difficult where one or more portions of the fastener also functions as part of the powertrain itself. For example, in a ring and pinion differential, it is common to mount the pinion gear shaft to the differential housing by providing a thread on the shaft and using a threaded nut to secure the pinion shaft to the housing/pinion bearing.

Such a joint is subject to not only the typical fastener joint forces, but also to the vibration, torque and resulting flex that is being transmitted through the drive train itself. This environment makes it difficult to keep the nut reliably tight. Such techniques as special thread cleaning operations, thread blasting and adhesives are used. All of these techniques increase the complexity and cost of assembly.

SUMMARY OF THE INVENTION

A fastener includes a nut having an anterior portion, a posterior portion and a threaded bore with a center axis extending from the anterior portion to the posterior portion, the outer surface of the posterior portion having an annular camming surface concentric with the center axis, the camming surface having a radius that decreases along the direction of the center axis away from the anterior portion toward the posterior portion; and a sleeve having a first end having an internal annular camming surface that engages the nut camming surface concentrically with the center axis and a second end having a thrusting surface. Tightening the fastener on an externally threaded member applies a force to the thrusting surface parallel to the center axis resulting in the nut camming surface and the sleeve camming surface cooperating to compress a portion of the threaded bore toward the threaded member.

BRIEF DESCRIPTION OF THE DRAWINGS

FIG. 4 is a front cross-sectional view of the assembled fastener of FIG. 1 through the center of the fastener with the addition of a retention lip;

FIG. 5 is a front elevation view of an example of a fastener according to some aspects of the invention installed on a pinion shaft with the front half of the fastener cut away;

FIG. 6 is a cross-sectional view of a prior art nut showing the elastic strain when installed on a pinion shaft.

DESCRIPTION OF THE PREFERRED EMBODIMENTS

Figure 1:
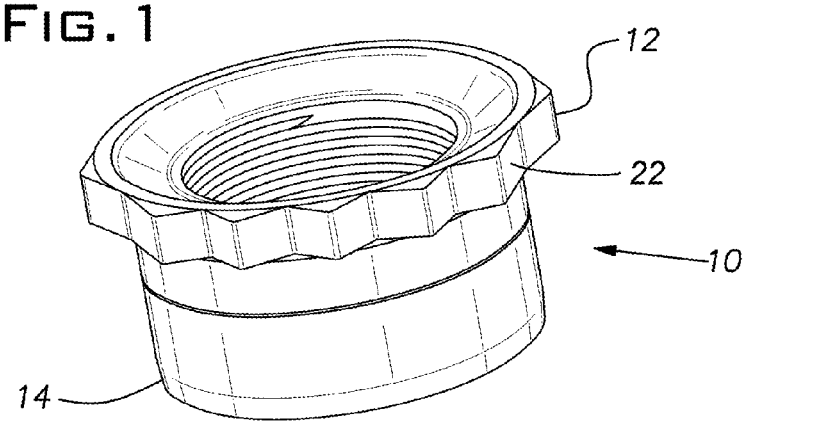
FIG. 1 is a perspective view of an example of a fastener according to some aspects of the invention.
Figure 2:
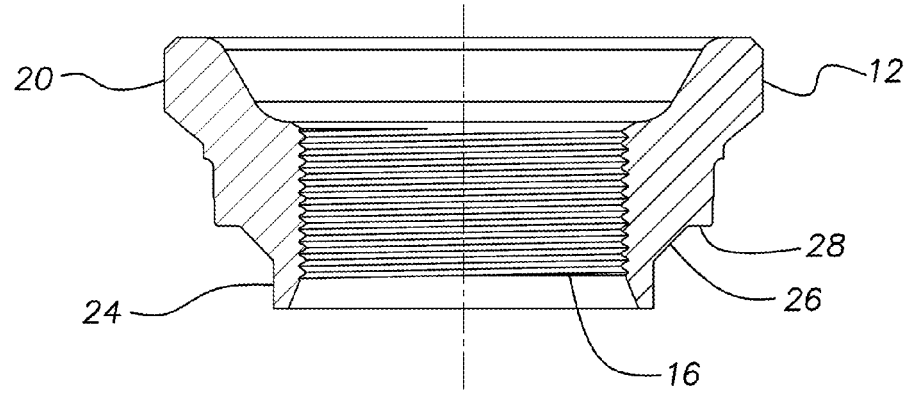
FIG. 2 is a front cross-sectional view of the nut of the fastener of FIG. 1 through the center of the nut.
Figure 3:
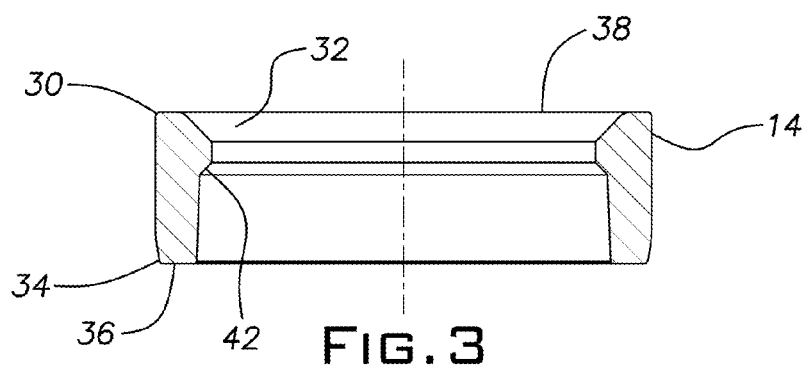
FIG. 3 is a front cross-sectional view of the sleeve of the fastener of FIG. 1 though the center of the sleeve.

Referring to FIGS. 1-4, a fastener 10 includes a nut 12 and a sleeve 14.

The nut 12 includes a threaded bore 16 with a center axis 18. The anterior portion 20 of the nut 12 includes wrench engagements 22 used for tightening the fastener 10. The posterior portion 24 of the nut 12 includes an annular camming surface 26 concentric with the center axis 18 and having a radius that decreases along the direction of center axis 18 in a direction away from the anterior portion 20 toward the posterior portion 24. A shoulder 28 provides a camming block.

The sleeve 14 includes a first end 30 with an internal annular camming surface 32 and a second end 34 with a thrusting surface 36. The first end 30 also has a flat portion 38 that provides a camming block.

When the sleeve 14 is installed on the posterior portion 24 of the nut 12, the camming surface 32 engages the camming surface 26 concentrically with the center axis 18. The camming surfaces 26, 32 may be, for example, at an angle of 45 degrees plus or minus 15 degrees with respect to the center axis 18; or preferably 45 degrees plus or minus 5 degrees with respect to the center axis 18.

Referring to FIG. 4, a retention lip 40 may be added to the posterior portion 24, for example, by slightly swaging the posterior portion 24 after assembling the sleeve 14 onto the posterior portion 24. The retention lip 40 then cooperates with the inner lip 42 of the sleeve 14 to retain the sleeve 14 on the nut 12 while still permitting the nut 12 and the sleeve to rotate independently. It is of course possible to provide other forms of retention members such as, for example, members that do not completely encircle the fastener.

Referring to FIG. 5, the fastener 10 is shown installed on a pinion shaft 44. As the nut 12 is tightened, the thrusting surface 36 bears against the differential housing/bearing 46. As a result, a force is applied to the thrusting surface 36 parallel to the center axis 18 resulting in the camming surface 26 and the camming surface 32 cooperating to compress a portion 48 of the threaded bore 16 toward the pinion shaft 44. While a pinion shaft is used as an example, the fastener 10 can be used with other threaded members as well. The camming blocks interact to limit the travel of the sleeve 14, thereby limiting the compression of the threaded bore 16 toward the threaded member.

In addition, the sleeve 14 can include a crush portion 50 that is crushable to provide a specific thrust load.

Referring to FIG. 6, calculated values of elastic strain are shown for a prior art pinion nut while installed on a pinion shaft. It should be noted that most of the strain is on the first few thread of the nut (e.g., 0.00100, 0.00117, 0.00100 and 0.00117.

Figure 7:
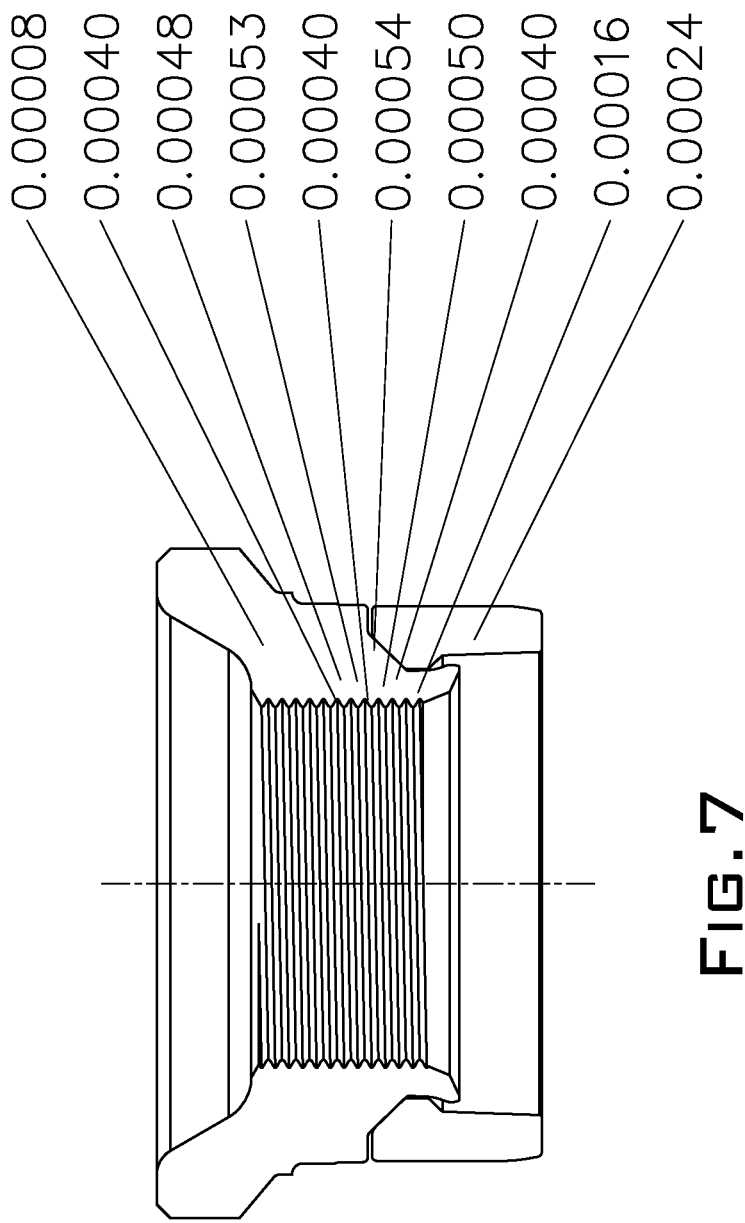
FIG. 7 is a cross-sectional view of an example of a fastener according to some aspects of the invention showing the elastic strain when installed on a pinion shaft.

Referring to FIG. 7, under the same compression load, calculated values of elastic strain are shown for an example of a fastener according to some of the aspects of the invention while installed on a pinion shaft. It should be noted that the strain values are axially deeper along the threaded bore 16 of the fastener 10 toward the anterior portion 20 of the nut 12, and spread much more evenly over the threads. This results in improved resistance to loosening under the joint harshness environment inherent with a nut on a powertrain element. It has been found that less attention need be paid to thread preparation and/or locking adhesives.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A fastener, comprising:

a nut having an anterior portion, a posterior portion and a threaded bore with a center axis extending from said anterior portion to said posterior portion, the outer surface of said posterior portion having an annular flat camming block surface perpendicular to the center axis and a frustoconical camming surface concentric with said center axis, the camming surface having a radius that decreases along the direction of the center axis away from the anterior portion toward the posterior portion and the camming block having an inner radius greater than the maximum radius of the camming surface and being adjacent thereto; and a cylindrical sleeve having a first end having an annular flat camming block surface perpendicular to the center axis and an internal frustoconical camming surface that engages said nut camming surface concentrically with said center axis and a second end having a thrusting surface, said sleeve being axially longer than said nut camming surface, the camming block having an inner radius greater than the maximum radius of the camming surface and being adjacent thereto, wherein tightening said fastener on an externally threaded member applies a force to said thrusting surface parallel to said center axis resulting in said nut camming surface and said sleeve camming surface cooperating to compress a portion of said threaded bore toward said threaded member, the compression being limited by engagement of said camming block surfaces.

2. A fastener according to claim 1, wherein said posterior portion of said nut includes an annular flared out portion and the interior of the sleeve includes an annular lip, the flared portion and the lip cooperating to retain the nut and the sleeve together while permitting independent rotation about the central axis.

3. A fastener according to claim 1, wherein said sleeve second end includes a crush portion that is crushable to provide a specific thrust load.

* * * * *